…

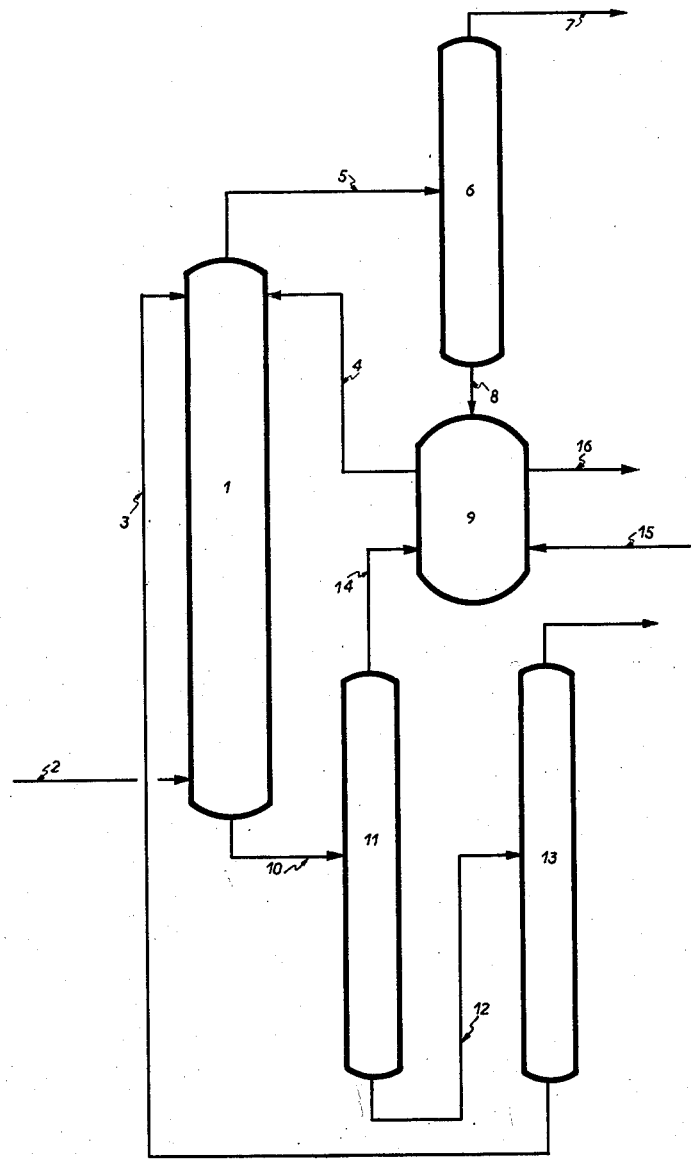

United States Patent Office 3,152,870
Patented Oct. 13, 1964

3,152,870
PROCESS FOR MANUFACTURING CHLORINE BY OXIDATION OF HYDROCHLORIC ACID
Pierre Baumgartner, Asnieres, and Pierre Duhaut, Le Vesinet, France, assignors to Institut Français du Petrole, des Carburants et Lubrifiants, Paris, France
Filed July 25, 1960, Ser. No. 45,060
Claims priority, application France July 29, 1959
2 Claims. (Cl. 23—219)

The present invention relates to a new and useful process for manufacturing chlorine by oxidation of hydrochloric acid, using nitric acid as an intermediary oxidizing agent.

The use of nitric acid as an oxidizing agent for converting hydrochloric acid to chlorine is of particular interest in view of the fact that it is possible, in most cases, to proceed at relatively low temperatures and to obtain chlorine of a satisfactory degree of purity. According to such a process, using nitric acid as an oxidizing agent, the latter may be regenerated either by oxygen or by any oxygen-containing gas, such as air.

However, until now, such a process could not be carried out on an industrial scale due to its high cost and number of drawbacks, the most important of which are:

(1) The complexity of the process itself, which requires the establishment of important and costly plants, due to the corrosion phenomena, and in view of the numerous successive reactions involved, i.e., oxidation of hydrochloric acid by means of nitric acid, isolation of chlorine from the nitrosyl chloride formed, oxidation of the latter, separation of chlorine from nitrogen peroxide formed, and, finally, oxidation of the latter to nitric acid.

(2) The low velocity of the overall conversion, which requires, in view of obtaining a sufficient industrial output, either the use of voluminous installations of high cost and the carrying-out of the process at high temperatures and eventually under pressure for certain steps of said process, which results in a considerable increase of the corrosion phenomena.

(3) The corrosiveness of the reaction products with respect to the most usual materials, which corrosiveness is due to the presence of nitrosyl chloride.

It is, therefore, an object of our invention to provide for a more simple process than the conventional one, by suppressing two of the successive steps required for converting hydrochloric acid to chlorine in a continuous manner, i.e., the step of separating chlorine from nitrosyl chloride and the further step of oxidizing the latter.

It is another object of our invention to provide a direct and substantially quantitative conversion of hydrochloric acid to chlorine without substantial formation of nitrosyl chloride.

It is still another object of our invention to provide a process for converting hydrochloric acid to chlorine on an industrial scale with a high reaction velocity so as to produce chlorine with an important hourly output.

It is a further object of our invention to carry out this conversion under moderate temperature conditions, whereby the corrosion phenomena are greatly reduced.

It is still a further object of our invention to provide a process resulting, under identical temperature conditions, in a far lower corrosion than that produced by the conventional processes, due to the substantially total absence of nitrosyl chloride, the content of which in the gaseous reaction products is always lower than 5 percent and substantially non-existent when the process is carried out according to the preferred conditions of this invention.

It is yet another object of our invention to provide for a process enabling the substantially complete conversion of hydrochloric acid to chlorine.

These and other objects as will become apparent from the following specification and the appended claims are achieved, according to our invention, by carrying out the oxidation of hydrochloric acid by means of a mixture of nitric acid with a strong acid of low volatility, resulting in concentrated aqueous solutions of high acidity. As examples of such strong acid there are to be mentioned perchloric acid and sulfuric acid, the latter being, however, preferred in view of its higher stability and its higher content of hydrogen ions.

Hydrochloric acid may be used in the form of its aqueous solution at a relatively high concentration, preferably above 20 percent. However, according to the preferred way of carrying out the invention, in order to obtain the maximum of advantages and, particularly, the highest reaction velocities and the formation of only low amounts of nitrosyl chloride, it is preferable to use hydrochloric acid in the gaseous form.

The mixture of nitric acid with a strong acid may also contain a certain amount of water, corresponding at the most to 30 percent by weight of the total mixture.

It is, however, more advantageous to use a lower proportion of water, and good results have been obtained with oxidizing mixtures containing, by weight, 10 to 40% of nitric acid, 45 to 90% of strong acid and 5 to 25% of water, although the preferred proportions are in the range of 15 to 30% of nitric acid, 60 to 75% of strong acid and 10 to 20% of water, which preferred proportions result, according to the invention, in the substantially exclusive formation of chlorine and nitrogen peroxide.

According to one embodiment of the invention hydrochloric acid is contacted with the oxidizing mixture during a time sufficient for providing the conversion of the major part and preferably of at least 95 percent of the hydrochloric acid. However, in most cases, the conversion rate of hydrochloric acid attains 99 percent or more, with a satisfactory reaction velocity.

Any apparatus providing a good contact between the reactants may be used and the present invention is in no way limited to the use of a particular type of apparatus.

As examples, which are not to be considered as limiting the scope or applicability of the invention, there may be used for practising the latter one or several reaction vessels, eventually provided with stirring means and various devices employed in view of improving the contact between the reactants, such as baffles, holes, plates, Raschig rings and the like.

The reaction vessels are made of vitrified steel, glass, ceramics, nickel alloy, ferrosilicon, titanium or titanium alloy, tantalum and the like, or similar acid-resisting materials.

In these reaction vessels the process of the invention may be carried out either as a batch process or in a continuous manner, the respective flows of the reactants being in this latter case either parallel or in opposite directions, which latter provide for a countercurrent contact therebetween. It is also possible to maintain a stationary concentration of one of the reactants, for instance the oxidizing mixture, in the reaction vessel and cause a stream of the second reactant, for instance hydrochloric acid, to pass therethrough.

However, it is preferred to carry out the process of our invention in a continuous manner and by countercurrently contacting the reactants instead of passing hydrochloric acid through a bath of the oxidizing mixture, periodically renewed. As a matter of fact, in the batchwise process the oxidizing power of said oxidizing mixture progressively decreases, and, after a short period of use, becomes insufficient for preventing the formation of nitrosyl chloride.

When carrying out the process of this invention in a continuous manner and by countercurrently contacting the reactants, nitrosylchloride, to the extent of its possible formation in that reaction zone wherein hydrochloric acid is introduced, is progressively decomposed during its displacement throughout the reaction vessel, since it is contacted with a flow of oxidizing mixture of increasing oxidizing power.

In any case, whatever may be the type of arrangement adapted, the oxidizing mixture may be reused after having added nitric acid thereto and removed therefrom the water formed by the reaction.

The process of our invention may be carried out at a moderate temperature, for instance in the range of from 0° C. to the temperature at which the oxidizing mixture of nitric acid with strong acid begins to distill, said temperature being in most cases in the order of 120° C. when operating under atmospheric pressure, and being easily determined by means of a simple test.

However, temperatures of less than 30° C. must be preferably avoided, the most favorable temperature conditions being within the range of 40 to 80° C. at which it is preferred to carry out this invention; since at too low temperatures the reaction proceeds too slowly and the carrying-away of the nitrogen peroxide is insufficient and at too high temperatures corrosion phenomena are enhanced, particularly by the eventual carrying away of steam, and undesirable side reactions occur.

In most cases it is unnecessary to use non-atmospheric pressures, except, for example, if it is desired to facilitate the carrying-away of nitrogen peroxide by use of a subatmospheric pressure or to increase the hourly output by using hydrochloric acid under a superatmospheric pressure.

The mixture of gaseous products issuing from the reaction vessel, consisting essentially of chlorine and nitrogen peroxide, is fractionated so as to separate the latter products therefrom. Various separation techniques may be applied with equal success and therefore the present invention is not limited in scope to the specific use of one particular separation process. This separation step may be carried out, for instance, by fractional distillation of the mixture, whereby chlorine is obtained at the top of the distillation column, or by selective extraction of one of the components of the mixture, by means of a solvent, for instance by selective absorption of nitrogen peroxide in sulfuric acid having a concentration of at least 60% and preferably in the range of 75 to 85%. In the latter case nitrogen peroxide may be further liberated from sulfuric acid, in the form of a mixture of nitric acid and nitrogen oxides, by heating the solution at a temperature higher than 100° C. and preferably in the order of 120–150° C. when operating under atmospheric pressure, said separation step being further facilitated by the carrying-away of nitrogen peroxxide by means of air or an inert gas.

Nitrogen peroxide or mixtures of nitrogen-oxidized derivatives thus obtained may be thereafter treated, in the liquid or gaseous phase, by means of oxygen or of an oxygen-containing gas, such as air, in the presence of water or of a diluted nitric acid solution or even of an oxidizing mixture, poor in nitric acid, as issuing from the reaction vessel.

It is preferable, however, to previously submit the latter mixture to a fractional distillation so as to recover, at the top of the distillation column, nitric acid and water, which are transferred to the unit wherein conversion of nitrogen oxides is carried out, and to recover at the bottom of the column diluted sulfuric acid which may be itself submitted to distillation in order to remove a part of the water contained therein, and preferably in a continuous process, an amount of water substantially equal to that formed during the reaction.

According to another arrangement for carrying out the invention, the sulfuric acid in which there has been dissolved the nitrogen peroxide formed during the reaction, may be added to the oxidizing mixture either before or after the passage of the latter through that reaction vessel in which hydrochloric acid is oxidized.

Nitrogen peroxide is thus liberated together with nitric acid in the above-mentioned unit provided for distillation of this latter product.

Any other processes for converting nitrogen peroxide to nitric acid and for concentrating the oxidizing mixture may as well be used without departing from the scope of this invention. It is thus possible to obtain an oxidizing mixture of a composition substantially identical to that of the original mixture, the nitric acid consumed during the reaction being regenerated by oxidation of the formed nitrogen peroxide. A small supplemental amount of nitric acid or sulfuric acid is, however, advantageously added thereto for compensating operating losses, although the latter are almost negligible.

The accompanying drawing is a flow sheet showing a particular arrangement of apparatus for carrying out the process of our invention, but to which the latter is in no way to be limited.

According to this arrangement, whereby the process is carried out in a continuous manner, gaseous hydrochloric acid is delivered through pipe 2 to the tubular reaction vessel 1, wherein it is counter-currently contacted with a mixture of a strong mineral acid, such as sulfuric acid, with nitric acid, said two components being respectively delivered through pipes 3 and 4. The gaseous flow, consisting essentially of chlorine and nitrogen peroxide, passes through pipe 5 to the fractionating column 6, maintained at a temperature lower than the boiling point of nitrogen peroxide but higher than the boiling temperature of chlorine, under the prevailing pressure.

Chlorine, recovered at the top of the column 6 (through pipe 7) may, if desired, be submitted to further washing treatment whereas the nitrogen peroxide runs out through pipe 8 to the reaction vessel 9. The liquid stream issuing from the reaction vessel 1 is transferred, through pipe 10, to the fractionating column 11 maintained at such a temperature that at the top thereof at least a major part of the nitric acid present in the mixture is recovered, as well as a certain amount of water, whereas the liquid distillation residue passes through pipe 12 to the fractionating column 13 at the top of which further amounts of water are recovered, the concentrated mineral acid being recycled to the reaction vessel 1 through pipe 3.

Into the reaction vessel 9, the nitrogen peroxide delivered through pipe 8 is treated by means of a stream of oxygen or air supplied through pipe 15 and of diluted nitric acid, obtained by condensing vapors issued from column 11, supplied through pipe 14. The concentrated nitric acid thus obtained returns through pipe 4 to the reaction vessel 1, whereas the waste gases are evacuated through pipe 16.

According to an important improvement of the above-described process, the mother-liquors, after having passed through the reaction zone, wherein they have been contacted with hydrochloric acid, are brought to a temperature higher than that prevailing in said reaction zone, in the absence of any hydrochloric acid supply, so as to remove substantially completely chlorine and its derivatives dissolved in the mother-liquors; this removal is demonstrated, for instance, by the absence of any reaction between the mother-liquors and an aqueous solution of silver nitrate.

In most cases it is, however, disadvantageous to submit the mother-liquors to too high a temperature, the temperature at which they begin to distill being a maximum value which must not be exceeded if it is desired to avoid the recycling of the distillate into that reaction vessel provided for oxidizing hydrochloric acid, without obtaining therefrom any significant improvement in the lowering of the content in chlorinated compounds of the mother-liquors.

At the most it might be envisaged to carry away by distillation a small fraction of said mother-liquors, for instance lower than 20 percent and preferably than 1 percent, which fraction is returned to the main reaction vessel.

In addition it should be mentioned that it is not necessary to carry out the removal of gas in a separate reaction vessel, since this operation may as well be effected in the lower part of the main reaction vessel below the inlet opening through which hydrochloric acid is supplied, provided that this lower part of the reaction vessel is brought to a temperature higher than that prevailing in the reaction zone.

In order to enable those skilled in the art to better understand the method of our invention and in what manner the same can be carried out, the following examples are given with reference to the accompanying drawing. These examples as well as the drawing are not to be considered as limiting in any way the scope of our invention, since they are only given for illustrative purposes.

*Example I*

This example illustrates the carrying out of this invention in a continuous manner by using sulfuric acid as a strong mineral acid.

The reaction vessel 1, hereabove described, having a capacity of 0.8 liter, is maintained at a temperature of 60° C. and continuously fed with a 49% nitric acid solution and 96% sulfuric acid so as to obtain an oxidizing mixture having the following weight contents:

| | Percent |
|---|---|
| $HNO_3$ | 16.8 |
| $H_2SO_4$ | 63.2 |
| $H_2O$ | 20.0 | which mixture is caused to pass through the reaction vessel at a rate of 0.453 liter per hour. The mixture is countercurrently contacted with hydrochloric acid which is supplied at a rate of 37 liters per hour under normal conditions of temperature and pressure.

The conversion rate of hydrochloric acid is higher than 99% and the reaction products obtained consist of a mixture of chlorine with gaseous nitrogen peroxide free from nitrosyl chloride and are distilled in column 6. There are thus recovered 57.5 grams per hour of gaseous chlorine and 40 grams per hour of liquid nitrogen peroxide.

The liquid oxidizing mixture issuing from the reaction vessel 1, in which is dissolved a portion of the nitrogen peroxide formed (35 grams per hour) is transferred to the two fractionating columns 11 and 13, the first of which is made of a material resistant to the corrosive action of mixtures of nitric acid with hydrochloric acid, in view of the presence of chlorinated compounds in small amounts, corresponding to about 0.5 gram per hour of chlorine, in the mother-liquors.

The diluted nitric acid recovered, which still contains traces of chlorine, is treated by means of nitrogen peroxide and air in the reaction vessel 9, either under atmospheric pressure, the nitrogen peroxide being in the gaseous form, or under a superatmospheric pressure, preferably sufficient for maintaining nitrogen peroxide in the liquid state. The resulting 49% nitric acid solution and the 96% sulfuric acid obtained at the outlet of fractionating column are recycled to the reaction vessel 1.

*Example II*

This example relates to the carrying out of the process of our invention in a discontinuous manner, and shows the considerable yield improvement in the oxidizing treatment of hydrochloric acid, obtainable by adding a strong mineral acid to the nitric acid used as an oxidizing agent.

By heating to 60° C. a mixture of 220 ml. of 8.15 N nitric acid and 80 ml. of 12 N hydrochloric acid solution, during 45 minutes, 1 gram of gaseous products (consisting of chlorine, oxidized nitrogen derivatives and nitrosyl chloride) are obtained.

By replacing in this preceding mixture 50 ml. of nitric acid by 50 ml. of perchloric acid 10 N there are obtained, after 45 minutes, 17.37 grams of gaseous products, and, when said 50 ml. of nitric acid are replaced by 50 ml. of a 35 N sulfuric acid solution, 22.2 grams of gases are produced in 32 minutes.

*Example III*

Example I is repeated in the same reaction vessel but further provided with Raschig rings.

The operating conditions being the same, there is obtained a gaseous mixture the distillation of which yields 57.8 grams per hour of chlorine and 70 grams per hour of nitrogen peroxide.

The content in chlorinated compounds of the mother-liquors is the same as according to Example I and their nitrogen peroxide content is 3 grams per hour.

*Example IV*

Example III is repeated, but with an oxidizing mixture of the following composition.

| Component: | Percent by weight |
|---|---|
| $HNO_3$ | 21 |
| $H_2SO_4$ | 65 |
| $H_2O$ | 14 | said mixture being used in equal amounts. The yield in chlorine and nitrogen peroxide is substantially the same as in Example III.

*Example V*

Example III is repeated, but with an oxidizing mixture of the following composition.

| Component: | Percent by weight |
|---|---|
| $HNO_3$ | 16 |
| $H_2SO_4$ | 71 |
| $H_2O$ | 13 | used at a rate of 0.6 liter per hour, other conditions being kept unchanged.

The yield in chlorine and nitrogen peroxide is substantially the same as in Example III.

*Example VI*

Example I is repeated but with an oxidizing mixture of the following composition.

| Component: | Percent by weight |
|---|---|
| $HNO_3$ | 20.7 |
| $H_2SO_4$ | 54.3 |
| $H_2O$ | 25.0 | used in the same amounts as in Example I. There are thus obtained 92.1 grams per hour of a gaseous flow having the following composition.

| Component | Percent by volume |
|---|---|
| $Cl_2$ | 50.8 |
| $NO_2$ | 46.0 |
| $NOCl$ | 3.2 |

Said mixture is absorbed in 80% sulfuric acid and the gaseous flow is washed with water so as to remove therefrom traces of hydrochloric acid formed by the reaction of nitrosyl chloride with sulfuric acid.

There are thus obtained 55.5 grams per hour of chlorine. The nitrated compounds are then removed from the sulfuric acid by progressively heating the latter up to a temperature of 225° C.

This example shows that the use of an oxidizing mixture, the composition of which is slightly different from that preferred according to this invention, results inevitably in the formation of nitrosyl chloride, the presence of which corresponds to a loss of chlorine (except if

Example VII

This example illustrates the fact that the use of an oxidizing mixture which does not correspond to the composition required according to this invention, does not result in the formation, in the process of nitric oxidation of hydrochloric acid, of a gaseous mixture consisting substantially exclusively of chlorine and nitrogen peroxide:

Example I is repeated, but with an oxidizing mixture having the following composition by weight:

| | Percent |
|---|---|
| $HNO_3$ | 26.7 |
| $H_2SO_4$ | 42.3 |
| $H_2O$ | 31.0 |

The conversion rate of gaseous hydrochloric acid, used in amounts of 37 liters per hour, is about 98.5% and there is recovered a gaseous mixture having the following composition by volume:

| | Percent |
|---|---|
| $Cl_2$ | 50.0 |
| $NO_2$ | 34.9 |
| $NOCl$ | 15.1 |

Example VIII

This example is provided for the same purpose as the preceding one.

Example I is repeated, but with an oxidizing mixture having the following weight contents:

| | Percent |
|---|---|
| $HNO_3$ | 36.7 |
| $H_2SO_4$ | 28.6 |
| $H_2O$ | 34.7 |

The conversion rate of hydrochloric acid, used in amounts of 37 liters per hour, is about 99%, and there is recovered a gaseous mixture having the following composition by volume:

| | Percent |
|---|---|
| $Cl_2$ | 47.5 |
| $NO_2$ | 16.0 |
| $NOCl$ | 32.6 |

This example shows that very substantial amounts of undesired nitrosyl chloride are formed when the required conditions of a water content of 5 to 25% and a sulfuric acid content of at least 45% are not fulfilled.

Example IX

Example III is repeated, except that the mother-liquors issuing from the main reaction vessel are caused to run down into a column provided with Raschig rings maintained at a temperature sufficient for heating the liquid contained therein to a temperature of 123° C., the top of the column being connected to the reaction vessel wherein the oxidation is carried out by means of a heat-insulated pipe entering the reaction vessel substantially in its middle portion.

Under such conditions, the whole amount of chlorine is to be found in the gaseous flow, whereas the mother-liquors are entirely freed from both chlorine and halogenated compounds previously contained therein, this being evidenced by the absence of any reaction of said mother-liquors with silver nitrate.

It will be understood that this invention is susceptible to further modification and, accordingly, it is desired to comprehend such modifications within this invention as may fall within the scope of the appended claims.

What we claim is:

1. A process for manufacturing chlorine by oxidation of hydrochloric acid, comprising the steps of: countercurrently contacting gaseous hydrochloric acid with an oxidizing liquid mixture consisting of 15–30% by weight of nitric acid, 60–75% by weight of sulfuric acid and 10–20% by weight of water, at a temperature between 40 and 80° C., separating from said oxidizing mixture a gaseous phase consisting essentially of chlorine and nitrogen peroxide and separating chlorine and nitrogen peroxide from each other.

2. A process for manufacturing chlorine by oxidation of hydrochloric acid, comprising the steps of: countercurrently contacting gaseous hydrochloric acid with an oxidizing liquid mixture consisting of 15–30% by weight of nitric acid, 60–75% by weight of perchloric acid and 10–20% by weight of water, at a temperature between 40 and 80° C., separating from said oxidizing mixture a gaseous phase consisting essentially of chlorine and nitrogen peroxide and separating chlorine and nitrogen peroxide from each other.

References Cited in the file of this patent

UNITED STATES PATENTS

| | | |
|---|---|---|
| 518,445 | Donald | Apr. 17, 1894 |
| 518,446 | Donald | Apr. 17, 1894 |
| 623,447 | Vogt et al. | Apr. 18, 1899 |
| 2,004,663 | Kaselitz | June 11, 1935 |
| 2,087,278 | Crittenden | July 20, 1937 |
| 2,665,195 | Congdon et al. | Jan. 5, 1954 |
| 2,793,102 | Frischer | May 21, 1957 |